United States Patent [19]

Sulkoski et al.

[11] 4,380,759

[45] Apr. 19, 1983

[54] APPARATUS TO ALERT A DEAF PERSON

[76] Inventors: Jerome Sulkoski, 7258 Bell Rd., Harborcreek, Pa. 16511; Richard D. Brugger, 5433 Clinton Dr., Erie, Pa. 16509

[21] Appl. No.: 204,089

[22] Filed: Nov. 5, 1980

[51] Int. Cl.[3] ........................ H04B 1/08; G08B 21/00

[52] U.S. Cl. ..................................... 340/407; 455/351

[58] Field of Search ........................... 340/407, 825.46; 455/89, 100, 351; 179/84 R

[56] References Cited

U.S. PATENT DOCUMENTS

| | | | |
|---|---|---|---|
| 2,582,277 | 1/1952 | Powlison | 340/407 |
| 2,703,344 | 3/1955 | Anderson | 340/407 |
| 3,017,631 | 1/1962 | Fink et al. | 340/407 |
| 3,618,070 | 11/1971 | Kagan | 340/407 |
| 4,028,502 | 6/1977 | Moricca et al. | 340/407 |
| 4,180,810 | 12/1979 | Muncheryan | 340/407 |
| 4,225,965 | 9/1980 | Baugh | 455/351 |

FOREIGN PATENT DOCUMENTS

| | | | |
|---|---|---|---|
| 2220409 | 1/1973 | Fed. Rep. of Germany | 340/407 |
| 2383488 | 11/1978 | France | 340/407 |
| 52-10603 | 1/1977 | Japan | 455/351 |

*Primary Examiner*—Gerald L. Brigance
*Attorney, Agent, or Firm*—Charles L. Lovercheck; Wayne L. Lovercheck; Dale R. Lovercheck

[57] ABSTRACT

An apparatus to alert a deaf person made up of an alarm device such as a smoke detector adapted to vibrate when actuated by smoke and a transmitter having a vibration sensor connected to the transmitter. The vibration sensor is supported in engagement with the smoke detector and adapted to sense the vibrations of the smoke detector and to transmit a signal to a remotely located receiver. The receiver has a vibrating reed with a tacticle member on its end for engaging a person to alert him when the receiver causes the reed to be vibrated.

7 Claims, 5 Drawing Figures

APPARATUS TO ALERT A DEAF PERSON

GENERAL DESCRIPTION OF THE INVENTION

Apparatus has been designed and assembled for the purpose of alerting a deaf person to certain specific dangers. One such danger is a fire, where he may be unable to hear the "audible" alarm that is characteristic of Smoke Alarms. This apparatus picks up the sound vibrations from the conventional Smoke Detector and causes a radio signal to be transmitted to a receiver and a "stimulator" located on the deaf person. A novel configuration of piezoelectric reed and special electronic circuitry is a part of this apparatus.

The apparatus uses commercially available devices, generally, since the intent was to construct a working model and to create an overall system design. Also, it is less expensive and easier to make changes and modifications at this level than it would be to do those things after miniaturization is performed.

REFERENCE TO PRIOR ART

The following patents are known to the inventer. U.S. Pat. Nos. 2,582,777; 3,618,070; 3,623,064; 3,786,628; 3,810,170; 3,911,416; 4,028,882 and 4,180,810.

U.S. Pat. Nos. 4,180,810; 3,810,170; 3,786,628 and 4,028,882 all show signal devices for awakening and/or alerting deaf persons. The other patents show various types of signaling devices. None of these patents show a device for alterting deaf persons of the type disclosed herein. Wherein the vibrating element engages the skin of the person which is responsive to a signal such as a smoke alarm.

OBJECTS OF THE INVENTION

It is an object of the invention to provide an improved signaling device for awaking and/or alerting a deaf person.

Another object of the invention is to provide a device for alerting a deaf person that is simple in construction, economical to manufacture and simple and efficient to use.

Another object of the invention is to provide a device for alerting a deaf person that utilizes a vibrating reed actuated by a radio receiver.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
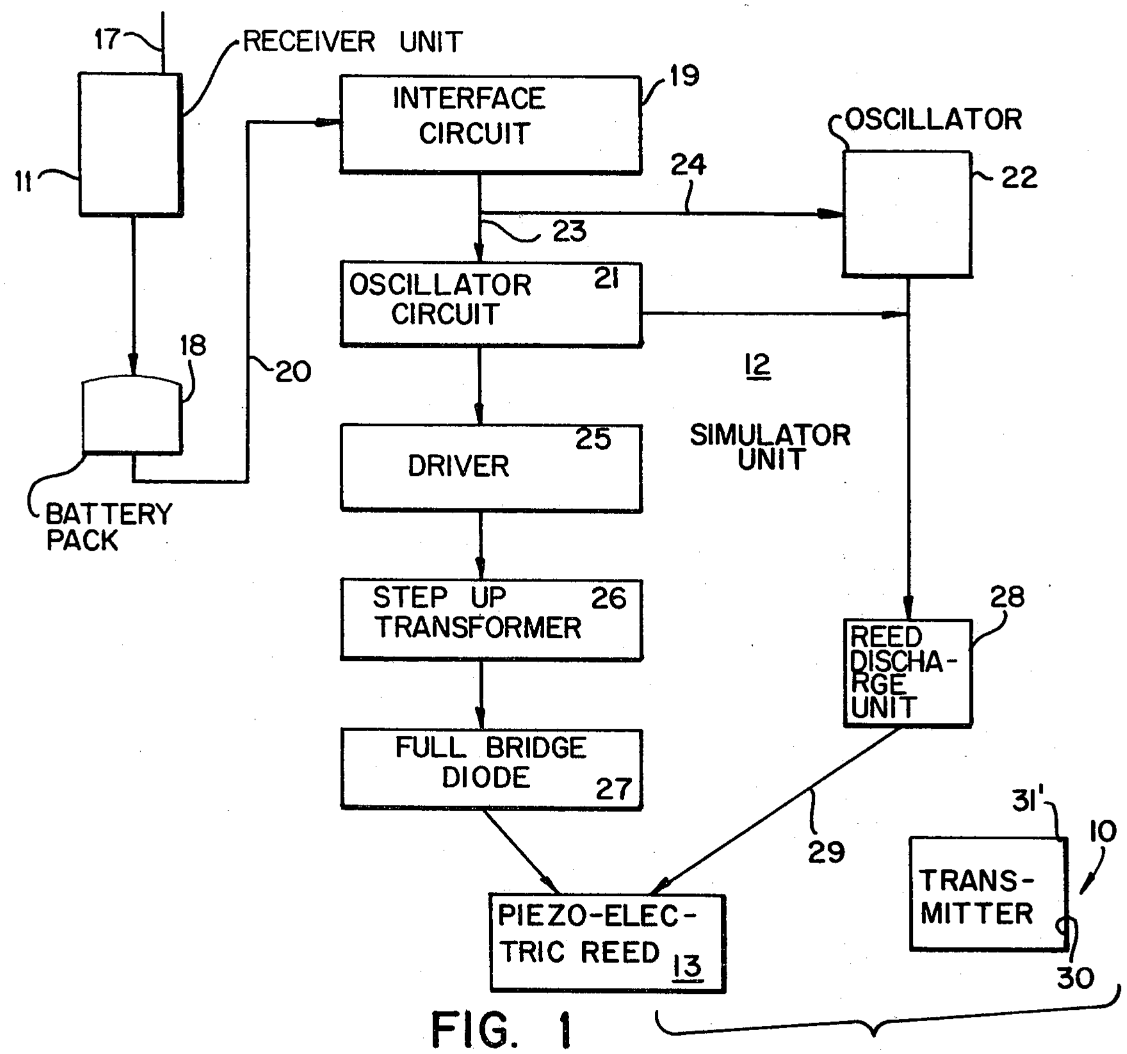
FIG. 1 is a block diagram of the receiver and piezoelectric reed circuit according to the invention.

Now with more particular reference to the drawings. FIG. 1 shows a block diagram of the transmitter 10 radio receiver 11 and interface circuit 12.

The tactile stimulator and receiver system as indicated generally in FIG. 1 includes the reed 13 which converts electrical signals into vibration that causes a sensation on the skin. The sensation feels like a mild electrical shock; however, there is no electrical current applied to the person. The reed 13 is a ceramic element that consists of two ceramic layers 14 and 15 and an intermediate layer 16 of brass which may be in the order of thickness of 0.002 inches. The total thickness of the ceramic layers and brass being about 0.024 inches. The reed has a skin engaging point 32' on its distal end.

Paint layers 14 and 15 are coated on with silver or aluminum paint 31 and 32 on their sides remote from the brass layer 16. The silver or aluminum paint is connected to the brass plate by solder and wires 33 and 34 are soldered to the silver paint at 35 and 36.

The material is designed to be polarized such that it deflects or bends when the electrical voltage is applied. From an electrical circuit standpoint, the bimorph appears to be a small capacitor. Specific device used is identified as a standard product familiar to those skilled in the art.

The receiver stimulator system shown in the block diagram of FIG. 1 shows the receiver as a conventional "beeper" familiar to those skilled in the art. Other sizes and styles of "beeper" are available and would be suitable. Most commercial units have a range of at least a half mile which is much further than is needed for the present application. A shorter range receiver could be made smaller.

Figure 2:
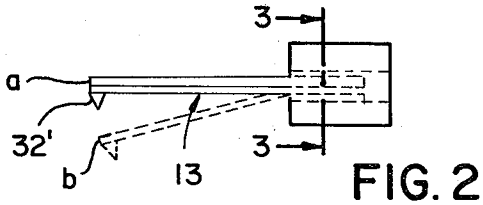
FIG. 2 is an isometric view of the vibrating piezoelectric reed bimorph pertaining to the invention.
Figure 3:
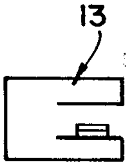
FIG. 3 is a top cross-sectional view taken on line 33 of FIG. 2.
Figure 4:
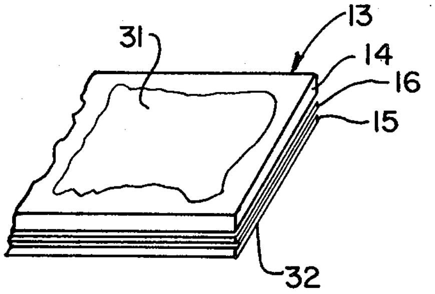
FIG. 4 is a partial isometric view of the reed showing the paint coating on the ceramic.
Figure 5:
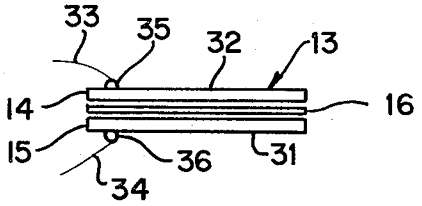
FIG. 5 is enlarged side view of the reed showing the paint coating.

Following from the packaged receiver unit 11, with electronic components and internal antenna 17, signal goes through the coupling circuit and battery pack 18, to a plug-socket and wiring to the stimulator unit 12. The latter generates 5 KHz pulses in ½ of a 556 integrated circuit, then uses a transformer to step up the voltage to 200 volts peak. The high frequency permits use of a relatively small transformer, which is commercially available. Over a period of approximately 3 ms, the pulses charge up the reed capacity to 200 volts. In accordance with piezoelectric action, the reed deflects (bends) in one direction while the voltage is applied. Then for the following approximately 3 ms, the 5 KHz oscillator is turned off, and the charge in the reed capacity is discharged to zero volts, causing the reed to bend back to its original position. Thus, the reed bends back and forth between position (a) and position (b, shown dashed), shown in FIG. 2. Thus, the reed vibrates at about 160 Hz, a frequency to which the skin is sensitive to vibrations. The second ½ of the 556 integrated circuit provides the 160 Hz.

The block diagram of the receiver system includes the reed stimulator. The "beeper" radio receiver which has a suitable antenna 17 of a conventional type, and the "beeper" is connected to the coupling circuit and battery 18 to the interface circuit 19 by way of line 20. The interface 19 is connected to the oscillator 21 and oscillator 22 by means of the lines 23 and 24 respectively. The driver 25 is connected to the oscillator 21 and to the step-up transformer 26 which is in turn connected to the full-wave diode bridge 27 which is connected to the piezoelectric reed. The oscillator 22 is connected to the reed discharge circuit 28 to the piezoelectric reed 13 through line 29.

The transmitter system 10 has two kinds of triggers available. One is a simple switch closure 30, the other is a vibration pickup that can be attached to the case of the smoke alarm detector or other suitable device indicated at 31'. No electrical connection is necessary between the smoke detector and the pickup 31', but the pickup 31' is merely supported against the smoke detector to pick up the vibrations therefrom. The vibration sensor is connected between the + and − terminals on the transmitter. Two independent vibration sensors are provided. FIG. 1 shows the transmitter and receiver system, including the transmitter and receiver, antennas and special circuit to indicate by LED when the system is transmitting.

Miniaturization can be achieved but the degree of miniaturization depends upon the final needs and quantity of production units expected to be sold. A high degree of miniaturization is more costly in small production runs than in moderate degrees of miniaturization. The size of reed probably cannot be reduced; however, the electronic circuitry can be reduced by Hybridization or even by Large Scale Integration, as is done in digital watches and in calculators. The transformer can be reduced in size by going to a high permeability cupcore instead of the laminated core sso-1 device used. As an alternate, a higher frequency could be used. The usual considerations in the marketplace are size, return-on-investment, and must be thoroughly evaluated before moving into miniaturization.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. Apparatus to alert a deaf person of an emergency situation comprising:

a vibration sensor for sensing an audible alarm, a radio receiver, a radio transmitter having a vibration pickup adapted to sense the vibration of a smoke alarm, said radio receiver having means to receive transmissions from said transmitter, a tactile stimulator connected to said receiver, said tactile stimulator being adapted to be disposed in engagement with the skin of a person whereby said person is alerted by a transmission from said transmitter to said receiver and to said tactile stimulator when said smoke alarm is operating, said tactile stimulator being a piezoelectric reed connected to a skin engaging member terminating in an end that is substantially a conical member having a point adapted to vibrate at a frequency in the range of 160 HZ, said piezoelectric reed comprises a conductor member sandwiched between two relatively thin nonconductor members supported in fixed position at a first end and having said point member supported on its distal end, and adapted to vibrate in contact with said skin in response to a signal received by said receiver from said transmitter.

2. The Apparatus recited in claim 1 wherein said reed comprises two relatively thin layers of ceramic material and said conduction member comprises a thin layer of metallic material therebetween.

3. The Apparatus recited in claim 2 wherein said layers of ceramic material are approximately 0.010 inches thick and said metallic material is approximately 0.002 inches thick.

4. The Apparatus recited in claim 3 wherein said vibration sensor is supported in engagement with a smoke detector.

5. The Apparatus recited in claim 2 wherein said non-conductor members each have a coating of metallic material on their outer side and said electrical conductor member is connected to said coating.

6. The Apparatus recited in claim 5 wherein said coating of metallic material is silver paint.

7. The Apparatus recited in claim 6 wherein said silver paint is connected to wires.

* * * * *